(12) United States Patent
Kuroda et al.

(10) Patent No.: US 6,352,489 B1
(45) Date of Patent: Mar. 5, 2002

(54) ENGINE CONTROL SYSTEM FOR HYBRID VEHICLE

(75) Inventors: Shigetaka Kuroda; Kazutomo Sawamura; Yoichi Iwata; Keisuke Uchida; Yasuo Nakamoto, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/520,628

(22) Filed: Mar. 7, 2000

(30) Foreign Application Priority Data

Mar. 9, 1999 (JP) .......................................... 11-062413

(51) Int. Cl.⁷ ............................................. B60R 41/02
(52) U.S. Cl. ................... 477/5; 477/6; 477/8; 180/65.2
(58) Field of Search .............................. 477/2, 7, 8, 11, 477/5, 14; 475/5, 8; 180/65.1, 65.5

(56) References Cited

U.S. PATENT DOCUMENTS 5,887,670 A * 3/1999 Tabata et al. ............... 180/65.2
6,007,443 A * 12/1999 Onimaru et al. ................ 475/5

FOREIGN PATENT DOCUMENTS

| EP | 0 329 683 | 5/1998 |
| JP | 8-317505 | 11/1996 |
| JP | 10339334 | * 12/1998 |
| JP | 11107878 | * 4/1999 |
| JP | 11257119 | * 9/1999 |

* cited by examiner

Primary Examiner—Charles A. Marmor
Assistant Examiner—Tisha D. Lewis
(74) Attorney, Agent, or Firm—Armstrong, Westerman, Hattori, McLeland & Naughton, LLP (57) ABSTRACT

The engine control system for a hybrid vehicle, according to the present invention, having an internal combustion engine and an electric motor as driving force sources, comprises: a clutch, provided between the engine and a transmission system, for disabling and enabling driving force transmission between the engine and the transmission system; clutch disengagement detector for detecting engagement/disengagement of the clutch; engine speed detector for detecting an engine speed; and fuel cutter for permitting stopping and restarting of the engine in accordance with at least a result of detection by the clutch disengagement detector among predetermined drive conditions, and cutting fuel supply to the engine when the vehicle decelerates, a fuel-supply restart engine speed at which fuel supply is resumed being set in the fuel cutter. Stopping the engine is accomplished by cutting fuel supply by the fuel cutter, and once the engine stop is initiated, even when the engine speed reaches the fuel-supply restart engine speed, fuel supply cut by the fuel cutter is maintained, and when the engine speed detected by the engine speed detector at a time of disengagement of the clutch is detected by the clutch disengagement detector is equal to or lower than a predetermined engine speed, fuel supply cut by the fuel cutter is maintained whereas when the detected engine speed is higher than the predetermined engine speed, fuel supply is restarted.

4 Claims, 5 Drawing Sheets

ENGINE CONTROL SYSTEM FOR HYBRID VEHICLE

BACKGROUND OF THE INVENTION

1. Field of the Invention

This invention relates to an engine control system for a hybrid vehicle and, more particularly, to an engine control system for a hybrid vehicle which can maintain stopping the engine and deceleration fuel supply cut by determining the driver intention to stop the engine based on the manipulation of the clutch and the engine speed at the time of the clutch manipulation.

This application is based on Japanese Patent Application No. 11-62413, the contents of which are incorporated herein by reference.

2. Description of the Related Art

Conventionally, hybrid vehicles which carry motors as power sources for driving the vehicles in addition to engines are known. Hybrid vehicles are divided into series hybrid vehicles and parallel hybrid vehicles. In series hybrid vehicles, the engine drives a generator whose electric power output is used to drive the motor which, in turn, drives the wheels. In parallel hybrid vehicles, the motor coupled to the engine assists the rotation of the drive shaft of the engine while charging a battery with electric energy using the motor itself as a generator or using a separate generator.

Because the engines of such hybrid vehicles can constantly run within an engine-speed range suitable for producing high fuel mileage and a low emissions level or their drive loads can be reduced, the hybrid vehicles can achieve lower fuel consumption and lower emissions levels than can conventional engine vehicles.

As disclosed in, for example, Japanese Unexamined Patent Application, First Publication Hei 8-317505, some of those hybrid vehicles are designed to be capable of stopping the operation of the engine in accordance with predetermined driving conditions.

Because of the ability to stop the operation of the engine, such a hybrid vehicle is superb in preventing over-charging of the battery or achieving a further improvement in fuel consumption but has the following problem.

When the fuel supply is cut during deceleration, and when the driver tries to accelerate the vehicle by manipulating the clutch and changing the gear, some shocks or engine stalling may occur at a low engine speed (this problem does not occur when the engine speed is at a certain speed or higher) at the time of restarting the engine following the engagement of the clutch. This may give the driver an uncomfortable feeling.

There is, therefore, a demand for a means which can ensure smooth driving that reflects the driver intention by determining from various manipulations done by the driver including the aforementioned clutch manipulation if the driver intends to stop the vehicle.

SUMMARY OF THE INVENTION

Accordingly, it is an object of the present invention to provide an engine control system for a hybrid vehicle, which determines if the driver intends to stop the vehicle when the clutch is disengaged, and can therefore smoothly stop the engine.

To achieve this object, according to one aspect of this invention, an engine control system for a hybrid vehicle, having an internal combustion engine (e.g., an engine E in one embodiment) and an electric motor (e.g., a motor M in the embodiment) as driving force sources, comprises a clutch, provided between the engine and a transmission system (e.g., a transmission system T in the embodiment), for disabling and enabling driving force transmission between the engine and the transmission system; clutch disengagement detector (e.g., a clutch switch in the embodiment) for detecting engagement and disengagement of the clutch; engine speed detector (e.g., an engine speed sensor $S_5$ in the embodiment) for detecting an engine speed (e.g., an engine speed NE in the embodiment); and fuel cutter (e.g., a process by an engine ECU 1 in the embodiment) for permitting stopping and restarting of the engine in accordance with at least a result of detection by the clutch disengagement detector among predetermined drive conditions, and cutting fuel supply to the engine when the vehicle decelerates, a fuel-supply restart engine speed (e.g., an engine speed of 1000 to 1500 rpm in the embodiment) at which fuel supply is resumed being set in the fuel cutter, wherein stopping the engine is accomplished by fuel supply cut by the fuel cutter, and once the engine stop control is initiated, when the engine speed reaches the fuel-supply restart engine speed, fuel supply cut by the fuel cutter is maintained, and when the engine speed detected by the engine speed detector at a time disengagement of the clutch is detected by the clutch disengagement detector (e.g., a low engine speed NECLSW when the clutch is actuated in the embodiment) is equal to or lower than a predetermined engine speed (e.g., a low engine-speed upper limit NECLMG when the clutch is actuated in the embodiment), cutoff of fuel supply by the fuel cutter is maintained whereas when the detected engine speed is higher than the predetermined engine speed, fuel supply is restarted.

With the above structure, when the engine speed with the clutch disengaged is equal to or lower than a predetermined engine speed equal to or lower than the idling speed, fuel supply cut is maintained considering that the driver has an intention to stop the vehicle even if the engine speed has reached the fuel-supply restart engine speed set in the fuel cutter. This can guarantee engine control that fulfills the driver's intention to stop the vehicle and reflects the driver's intention.

In this engine control system, fuel supply cut by the fuel cutter may be maintained at least when the shift position of the vehicle running at a vehicle speed equal to or lower than a predetermined value (e.g., a vehicle speed upper limit VFCMGST at which fuel cutting during deceleration is maintained in step S123 in the embodiment) is other than a reverse position (reverse) and low position (first gear). For example, the condition involves a decision on the "shift position" in step S110 as to whether the shift position is the reverse position or another position and a decision in step S125 on the state of a flag F_NGRMG for determining if the shift position during deceleration is other than the low position (first gear) in the embodiment. This structure can ensure engine control that reflects the driver's intention more adequately.

In the engine control system, a condition for stopping the engine is that the brake pedal is actuated (e.g., "ON" as the result of the decision in step S128 in the embodiment). This structure can allow the engine to be stopped according to the driver's intention to stop the vehicle.

The predetermined engine speed (e.g., a low engine-speed upper limit NECLMG when the clutch is actuated) is equal to or lower than an idling speed.

DETAILED DESCRIPTION OF THE PREFERRED EMBODIMENT

A preferred embodiment of the present invention will be explained with reference to the accompanying drawings.

Figure 1:
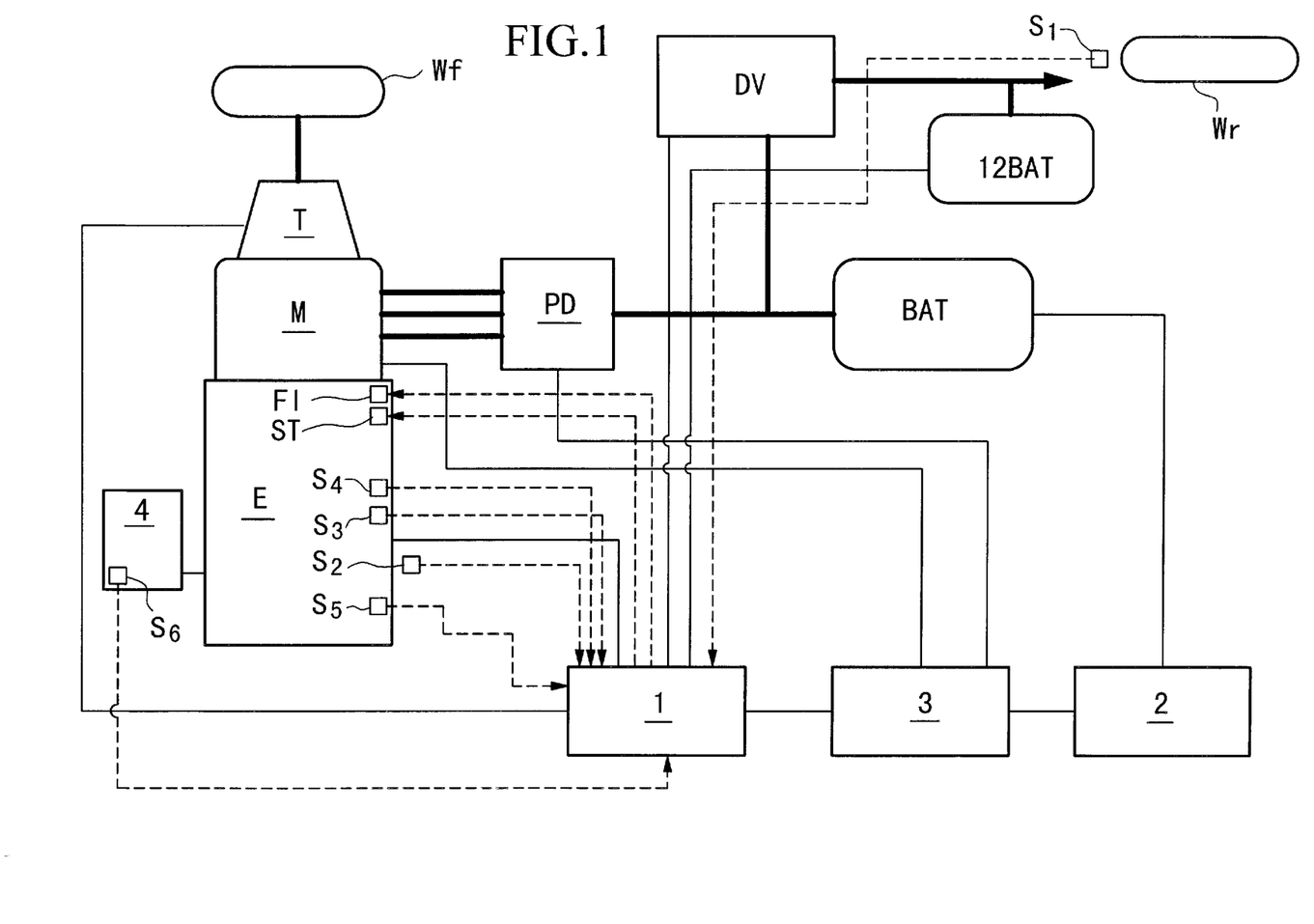
FIG. 1 is a schematic diagram showing the overall structure of one embodiment of this invention

FIG. 1 is a schematic diagram showing the overall structure of a parallel hybrid vehicle, specifically, a hybrid vehicle having a manual transmission system. Driving forces from both an engine E and a motor M are transmitted via a transmission T, such as an automatic transmission or a manual transmission, to front wheels Wf which are the drive wheels. When the hybrid vehicle decelerates and the driving force is transmitted from the front wheels Wf to the motor M, the motor M acts as a generator to generate so-called regenerative braking force, so that the kinetic energy of the vehicle body is stored as electric energy.

A power drive unit PD performs the driving and regeneration of the motor M in response to control commands from a motor ECU 3. A high-voltage battery BAT for sending and receiving electric energy to and from the motor M is connected to the power drive unit PD. The battery BAT includes a number of modules connected in series, each module having a number of cells connected in series. The hybrid vehicle includes a 12-volt auxiliary battery 12BAT for driving various accessories. The auxiliary battery 12BAT is connected to the battery BAT via a downverter DV. The downverter DV, controlled by an engine ECU 1, reduces the voltage from the battery BAT and charges the auxiliary battery 12BAT.

A battery ECU 2, for example, computes the remaining charge (or the state of charge) SOC of the battery BAT. In FIG. 1, reference numeral "4" denotes a brake vacuum control unit, and the broken-line block 5 is a CVTECU.

The engine ECU 1 controls fuel supply amount controller F1 for controlling the amount of fuel supplied to the engine E, a starter motor ST, an ignition timing, etc. in addition to the motor ECU 3 and the downverter DV.

Therefore, the engine ECU 1 receives SOC information on the battery remaining charge from the battery ECU 2, motor information from the motor ECU 3 and signals from various sensors and various switches. The sensors include a vehicle speed (V) sensor $S_1$, a throttle-opening-state (TH) sensor $S_2$, engine coolant temperature (TW) sensor $S_3$, an engine intake-air temperature (TA) sensor $S_4$, an engine speed (NE) sensor $S_5$ and a brakevacuum sensor $S_6$ for detecting the brake-master-power negative pressure. Those switches, though not illustrated, include an ignition switch, a reverse switch, a brake switch, a neutral switch and a clutch switch.

Based on the signals from the various sensors and the various switches, the SOC information and the motor information, the engine ECU 1 performs fuel supply cut and starting of the engine.

[Determination of Motor Operation Mode]

Figure 2:
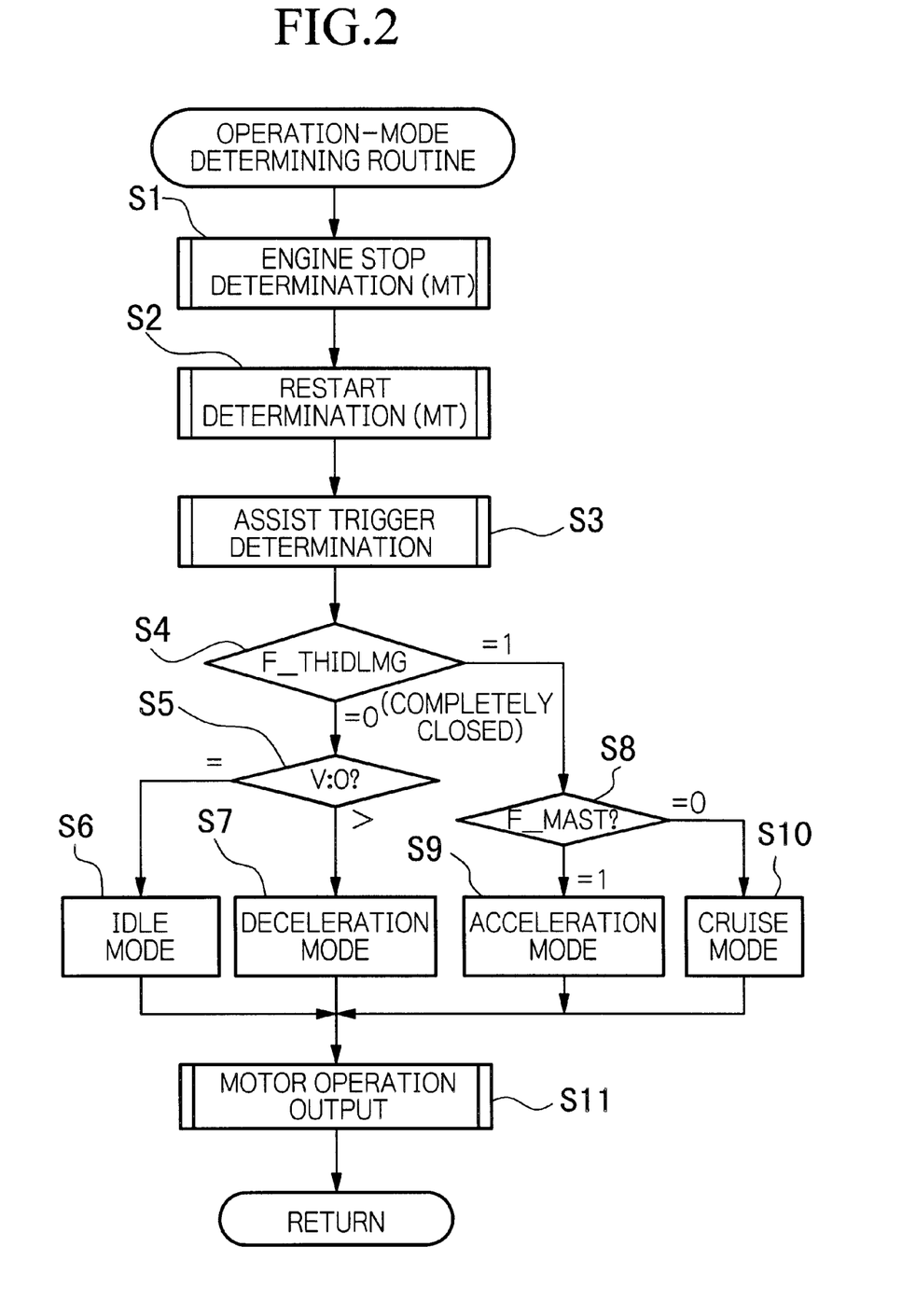
FIG. 2 is a flowchart showing a routine for determining the operation mode of a motor.

Referring to the flowchart of FIG. 2, the control mode for the motor of this hybrid vehicle (having a manual transmission) will be explained.

In step S1, an engine stop determination (for MT vehicle) which will be discussed later is carried out. Then, a restart determination is performed in step S2 after which the flow proceeds to step S3.

In step S3, an assist trigger determination is executed to determine whether or not to carry out assist by the motor. There are various assisting methods; for example, the determination can be made based on parameters such as the throttle opening state (e.g., throttle opening degree, or throttle opening amount) and the vehicle speed. Then, it is determined in step S4 whether the throttle is completely closed based on a throttle-completely-closed-state flag F_THIDLMG.

When in step S4 the throttle-completely-closed-state flag F_THIDLMG is "0", that is, when it is determined that the throttle valve is completely closed, and when it is determined in step S5 that the vehicle speed V is "0", that is, the vehicle is not running, the "idle mode" is selected in step S6, so that the engine E is maintained in an idling state.

When in step S4 the throttle-completely-closed-state flag F_THIDLMG is "0", that is, when it is determined that the throttle valve is completely closed, and when it is determined in step S5 that the vehicle speed V is not "0", the "deceleration mode" is selected in step S7 and regenerative braking by the motor M is carried out. Further, the regeneration energy is stored to charge the battery.

When in step S4 the throttle-completely-closed-state flag F_THIDLMG is "1", that is, when it is determined that the throttle valve is open, the flow proceeds to step S8. In this step S8, it is determined based on a motor assist flag F_MAST whether to select the "acceleration mode" or the "cruise mode".

When it is determined in step S3 that the assist by the motor M is required, and when it is determined in step S8 that the motor assist flag F_MAST is "1", the "acceleration mode" is selected in step S9, and the motor M assists the driving force of the engine E. When it is determined in step S8 that the motor assist flag F_MAST is "0", the "cruise mode" is selected in step S10, and the motor M is not driven so that the vehicle runs only on the driving force from the engine E. Accordingly, step S11 provides the output from the motor corresponding to each mode.

The following describes the "engine stop determination", and the "restart determination" in the above-described flowchart.

[Engine Stop Determination (MT)]

Figure 3:
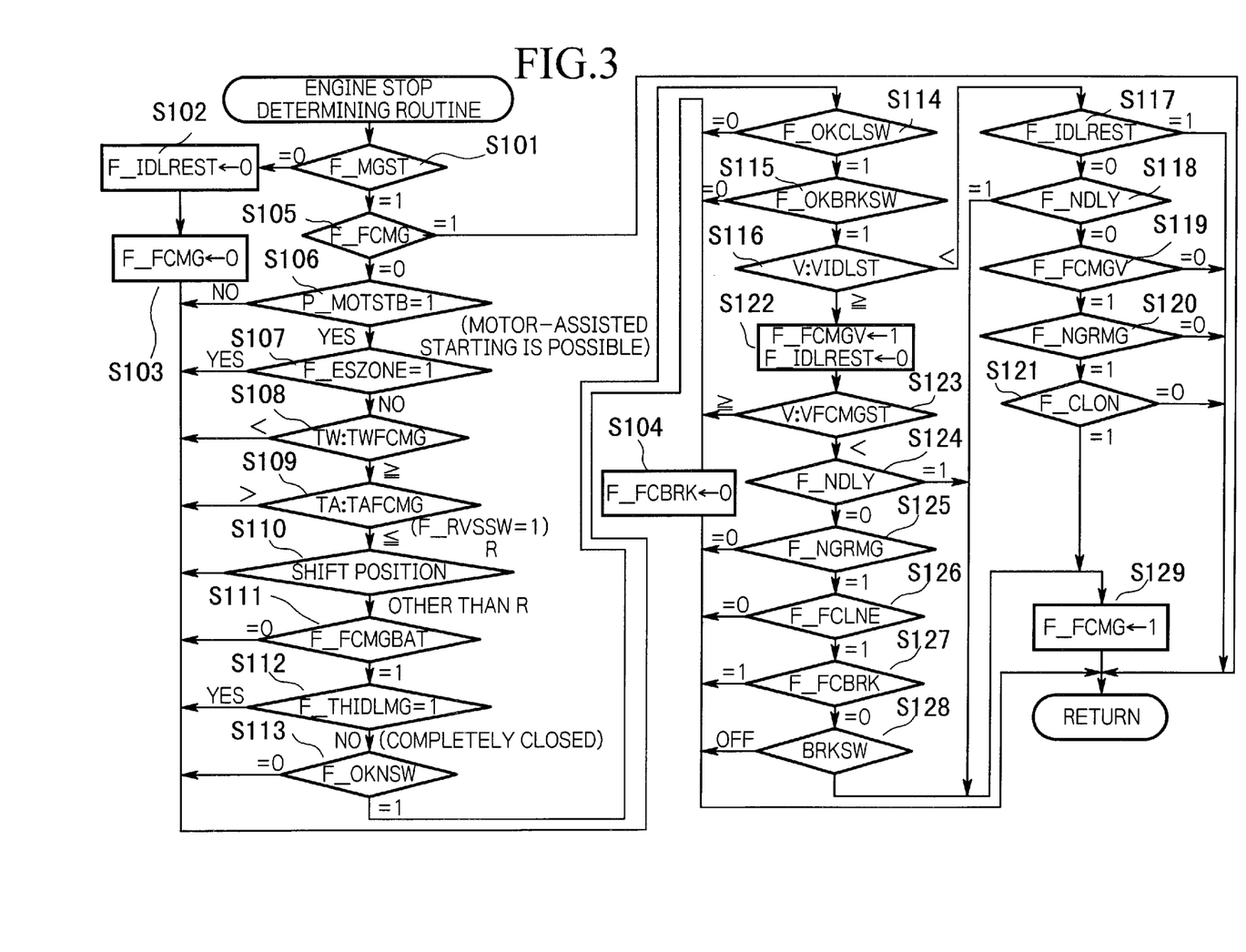
FIG. 3 is a flowchart illustrating a routine for determining whether or not to stop the engine of an MT vehicle.

Now, the engine stop determination will be discussed. In the engine stop determination, specifically, whether or not to permit the engine to stop is determined according to the running conditions of the engine and the driver's operation, basically on the condition that stopping the engine is permitted only when the start of the engine can be assisted by the motor.

FIG. 3 is a flowchart illustrating a routine for determining whether or not to stop the engine of an MT vehicle. The state of a start-switch-ON start flag F_MGST is determined in step S101 in this flowchart. When the start-switch-ON start flag F_MGST is "0", that is, when it is the first running, a restart flag F_IDLREST for restarting the engine by opening the throttle is set to "0" in step S102. Then, the engine-stop control execution flag F_FCMG is set to "0" in the next step S103. In the next step S104, "0" is set to a flag F_FCBRK which indicates that the brake is released while fuel supply cut originated from deceleration is continuing, after which the flow returns.

That is, at the time of first running, the individual flags are initialized by the operation from the ON action of the ignition switch to the ON action of the start switch.

When it is determined in step S101 that the start-switch-ON start flag F_MGST is "1" or it is not the first running, the state of the engine-stop control execution flag F_FCMG is checked in step S105. The decision here is made to distinguish the condition for stopping the engine from the condition for restarting the engine after the engine has stopped. When the flag F_FCMG was already "1", this step is passed and the flow returns to the operation-mode determining routine to execute the restart determination.

When it is determined that the engine-stop control execution flag F_FCMG is "0", it is then determined in step S106 if the motor start enable flag F_MOTSTB is "1", that is, if the starting of the engine by the motor is possible. Whether or not the start of the engine can be performed by the motor is checked by signals from the motor ECU 3. When it is determined that the flag F_MOTSTB is "0", the starting of the engine by the motor is not possible so that the flow goes to step S104. When it is determined that the flag F_MOTSTB is "1", the flow goes to step S107. Thus, if the starting of the engine by the motor is not possible, therefore, the engine will not be stopped.

In step S107, it is determined if the energy-storage-zone flag F_ESZONE is "1", that is, the battery's remaining charge SOC is in an over-discharge zone (e.g., 20% or smaller). This prevents the engine from being stopped when the battery's remaining charge is not much.

When the energy-storage-zone flag F_ESZONE is "1", that is, when it is determined that the battery's remaining charge SOC is in the over-discharge zone, the flow proceeds to step S104. When it is determined that this flag F_ESZONE is "0", i.e., that the battery's remaining charge SOC is not in the over-discharge zone, the coolant temperature TW is compared with the coolant-temperature lower limit TWFCMG (e.g., 40° C.) for stopping the engine in step S108.

When it is determined that the coolant temperature TW is less than the coolant-temperature lower limit TWFCMG, the flow goes to step S104. This prevents the engine from being stopped when it is not in a fully warmed-up state. When it is determined that the coolant temperature TW is equal to or greater than the coolant-temperature lower limit TWFCMG, the intake-air temperature TA is compared with an intake-air temperature upper limit TAFCMG (e.g., 40) for stopping the engine in step S109.

When it is determined that the intake-air temperature TA is greater than the intake-air temperature upper limit TAFCMG, the flow proceeds to step S104. Accordingly, when the intake-air temperature is high, the engine is not stopped in consideration of the deterioration of the startability and the air conditioning performance that should be secured. When it is determined that the intake-air temperature TA is equal to or less than the intake-air temperature upper limit TAFCMG for stopping the engine, the flow proceeds to step S110.

In step S110, it is determined whether or not the shift position is the position R (Reverse). When a reverse switch flag F_RVSSW is "1", that is, when it is determined that the shift position is the position R, the flow proceeds to step S104. This prevents the engine from being stopped when the vehicle starts or stops at a low speed in the reverse mode, thus improving the operability. When it is determined that the shift position is other than the position R, the state of a large-consumption-in-12V-system and restart enable flag F_FCMGBAT is determined in step S111. When it is determined that this flag F_FCMGBAT is "0", that is, when restarting the engine is not possible due to large consumption in the 12V system, the flow advances to step S104.

When it is determined that the flag F_FCMGBAT is "1", that is, when restarting the engine is possible even with large consumption in the 12V system, the flow advances to step S112.

In step S112, it is determined whether or not the throttle-completely-closed-state flag F_THIDLMG is "1". When the flag F_THIDLMG is "1", that is, when it is determined that the throttle is not completely closed, the flow advances to step S104. As a result, the engine is not stopped. When the flag F_THIDLMG is "0", that is, when it is determined that the throttle is completely closed, the flow advances to step S113.

In step S113, the state of a neutral-switch-OK flag F_OKNSW is determined, and then the state of a clutch-switch-OK flag F_OKCLSW is determined in step S114. In the next step S115, the state of a brake-switch-OK flag F_OKBRKSW is determined.

Those steps S113, S114 and S115 determine if their associated switches are functioning adequately. When the switches are not failing, the respective flags are set to "1". When it is determined that the individual switches are normal, the flow advances to step S116. When each flag value is "0" because the associated switch is abnormal or is not checked as normal, the flow goes to step S104.

In step S116, the vehicle speed V is compared with an engine-stop-at-low-speed determining vehicle speed VIDLST (e.g., 3 km/h). This comparison allows fuel supply cut while the vehicle is running (at and after step S122) and the engine to be stopped when the vehicle is stopped (at and after step S117). This can improve the fuel consumption.

When it is determined in step S116 that the vehicle speed V is less than the engine-stop-at-low-speed determining vehicle speed VIDLST, the state of the restart flag F_IDLREST for restarting the engine by opening the throttle is determined in step S117. When the flag F_IDLREST is "1" or when it is determined that the throttle is opened, the flow returns. Accordingly, when the engine is restarted by turning the ignition switch ON or opening the throttle while the engine is stopped, this flag value becomes "1" and the engine will not be stopped again until the vehicle starts moving.

When it is determined that the restart flag F_IDLREST is "0", the flow advances to step S118. In this step S118, the state of a neutral keeping flag F_NDLY is determined. When the neutral keeping flag F_NDLY is "1", that is, when it is determined that the neutral state is maintained for a predetermined time, the flow goes to step S129. When it is determined that this flag F_NDLY is "0", the flow goes to step S119 which determines the state of a flag F_FCMGV for checking if the vehicle speed has exceeded a predetermined vehicle speed after starting of the engine by the starter. The expression "after starting of the engine by the starter" means after restarting (the same is true in the following description).

When it is determined that the flag F_FCMGV is "0", the flow returns. When it is determined that the flag F_FCMGV is "1", the flow advances to step S120 to check the state of a flag F_NGRMG for determining if the gear in use is other than the first gear. When this flag F_NGRMG is "0", that is, when it is determined that the vehicle has stopped during or after running on the first gear, the engine is not stopped because there may be a mode in which the vehicle starts right after stopping, such as a temporary stop mode. In this case, therefore, the flow returns. When it is determined that this flag F_NGRMG is "1", the state of a clutch-thrust keeping flag F_CLON is determined in step S121. When the clutch-thrust keeping flag F_CLON is "0", the flow returns.

When it is determined that the clutch-thrust keeping flag F_CLON is "1", the flow advances to step S129 to set the engine-stop control execution flag F_FCMG to "1" after which the flow returns. This causes the engine to stop when the vehicle is stopped without gear change with the clutch kept thrust at a gear position other than the first gear and reverse gear.

When it is determined in step S116 that the vehicle speed V is equal to or greater than the engine-stop-at-low-speed determining vehicle speed VIDLST, the flag F_FCMGV for checking if the vehicle speed has exceeded a predetermined vehicle speed after starting of the engine by the starter is set to "1", and the restart flag F_IDLREST for restarting the engine by opening the throttle is set to "0" in step S122. Then, the flow advances to step S123.

In step S123, the vehicle speed V is compared with a vehicle speed upper limit VFCMGST (e.g., 20 km/h) for maintaining fuel supply cut during deceleration. When it is determined that the vehicle speed V is equal to or [higher] greater than the vehicle speed upper limit VFCMGST, the flow advances to step S104. When it is determined that the vehicle speed V is less than the vehicle speed upper limit VFCMGST, the flow advances to step S124 to determine the state of the neutral keeping flag F_NDLY.

When it is determined that the neutral keeping flag F_NDLY is "1", the flow advances to step S129. When it is determined that the neutral keeping flag F_NDLY is "0", the flow moves to step S125. In step S125, the state of the flag F_NGRMG is checked to determine if a gear other than the first gear has been used. When this flag F_NGRMG is "0", the flow returns. When the flag F_NGRMG is "1", the state of a low engine-speed flag F_FCLNE at the time the clutch is thrust is determined in step S126.

When the engine speed NE at the time the clutch is thrust is greater than the predetermined value, it is determined that the flag F_CLNE is "0". In this case, the flow returns. When it is determined that the flag F_CLNE which indicates the result of the comparison of the engine speed NE at the time of thrusting the clutch with the predetermined value is "1", that is, when the clutch is free at an engine speed less than the predetermined engine speed NE, fuel supply cut during deceleration is maintained. Then, the state of a flag F_FCBRK indicating the brake having been released while fuel supply cut in deceleration is kept is determined in step S127.

Figure 5:
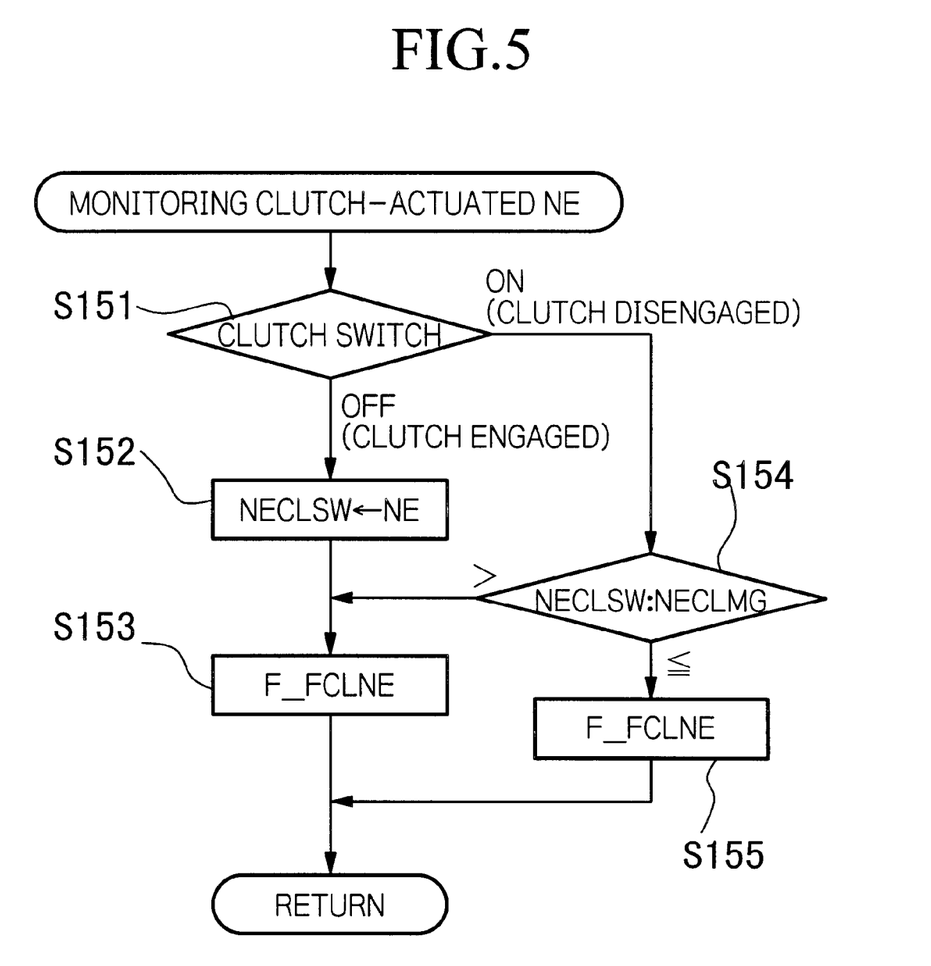
FIG. 5 is a flowchart showing a routine for monitoring the clutchactuated NE.

The value of the flag F_FCLNE is determined by a flowchart for monitoring the clutch-thrust NE shown in FIG. 5.

In FIG. 5, the state of the clutch switch is checked in step S151. When it is determined that the clutch switch is "OFF", that is, when the clutch is engaged, the flow advances to step S152 where the engine speed NE is input as a low engine speed NECLSW when the clutch is thrust. When the clutch is engaged, therefore, the engine speed is always monitored. In the next step S153, the flag F_FCLNE for determining the low engine speed is set to "0" when the clutch is thrust.

When it is determined in step S151 that the clutch switch is "ON", that is, when the clutch is disengaged, the flow advances to step S154 where the low engine speed NECLSW with the clutch thrust is compared with a low engine-speed upper limit NECLMG (e.g., 700 rpm) with the clutch thrust.

When it is determined in step S154 that the low engine speed NECLSW is equal to or less than the low engine-speed upper limit NECLMG, the flow advances to step S155 to set the aforementioned flag F_FCLNE to "1."

When it is determined in step S154 that the low engine speed NECLSW is greater than the low engine-speed upper limit NECLMG, on the other hand, the flow goes to step S153 to set the aforementioned flag F_FCLNE to "0."

When the flag F_FCLNE is "1", that is, when the engine speed at the time the clutch is thrust is equal to or less than the low engine-speed upper limit NECLMG, e.g., 700 rpm, it is assumed that the driver intends to stop the vehicle. Accordingly, deceleration fuel supply cut is maintained, thus guaranteeing the handling that is intended by the driver. When such a condition is not met, however, some shocks which would make the driver uncomfortable may be produced when the engine is started with the engine speed equal to or lower than the idling speed.

When in step S127 in FIG. 3 this flag F_FCBRK is "1", the flow returns. When this flag F_FCBRK is "0", the state of the brake switch is determined in step S128. When the brake switch is "OFF", the flow returns. When the brake switch is "ON", the engine-stop control flag F_FCMG is set to "1" in step S129 after which the flow returns.

[Restart Determination]

Figure 4:
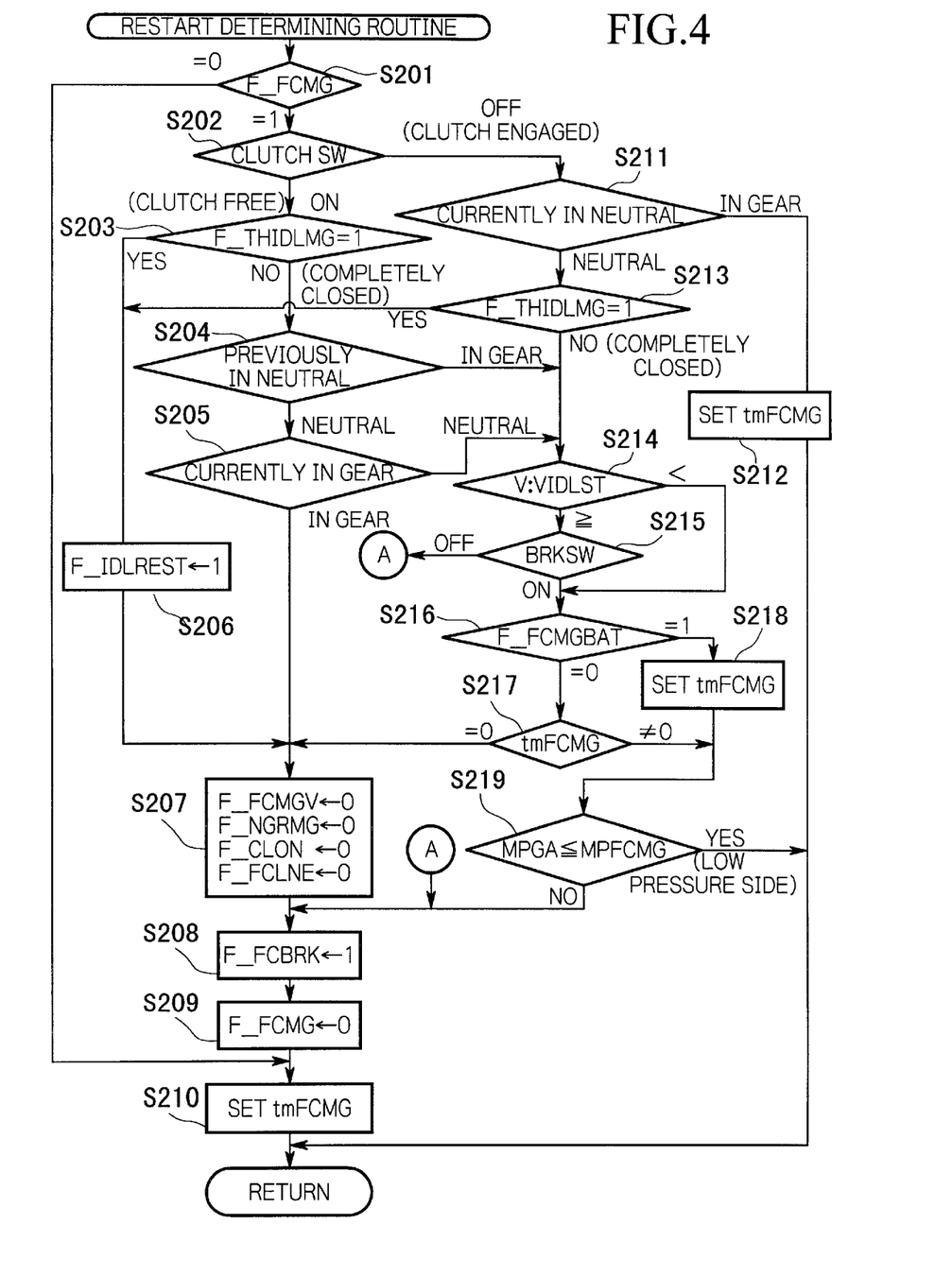
FIG. 4 is a flowchart illustrating a routine for determining whether or not to restart the MT vehicle.

FIG. 4 is a flowchart illustrating a restart determining routine.

Cutting of fuel is carried out by the fuel [cuter] cutter in the engine ECU 1 based on the engine speed NE, the vehicle speed V and the like. When the engine speed NE falls below a predetermined speed, this fuel cutter stops fuel supply cut and restarts fuel supply. This predetermined engine speed varies depending on the type of vehicle, and is set to, for example, 1000 to 1500 rpm. As the setting of the predetermined engine speed is done by the engine ECU 1, it does not appear in this restart determination and the above-described engine stop determination, which are both subroutines of the motor operation mode determination.

In the first step S201, the state of the engine-stop control execution flag F_FCMG is checked. Because the restart determination is performed when fuel supply cut by stopping the engine continues, when the engine-stop control execution flag F_FCMG is "0", this flowchart is passed, a restart-inhibiting delay timer tmFCMG when the remaining charge SOC of the battery goes below the lower limit is set in step S210, and the flow returns.

When the engine-stop control execution flag F_FCMG is "1", it is determined in step S202 whether the clutch switch is "ON" or "OFF". When in step S202 the clutch switch is "ON", that is, when it is determined that the clutch is free, it is then determined in step S203 if the throttle-completely-closed-state flag F_THIDLMG is "1."

When in step S203 the throttle-completely-closed-state flag F_THIDLMG is "1", that is, when it is determined that the throttle is not completely closed, the flow advances to step S206. In step S206, engine restart or returning from the fuel supply cut state is performed by opening the throttle and the restart flag F_IDLREST is set to "1". Stopping the engine or keeping fuel supply cut is therefore avoided by setting the flag this way.

In step S207, the flag F_FCMGV for checking if the vehicle speed has exceeded the predetermined vehicle speed after starter-oriented starting, the flag F_NGRMG for checking if the gear in use is other than the first gear, the clutch-thrust keeping flag F_CLON and the flag F_CLNE for checking if the engine speed NE at the time of thrusting the clutch is greater than the predetermined value are set to "0." In step S208, the flag F_FCBRK which indicates that the brake has been released during deceleration fuel supply cut is set to "1." In step S209, the engine-stop control execution flag F_FCMG is set to "0" after which the flow advances to step S210, and then the flow returns. This scheme prevents stopping of the engine, or fuel supply cut from being carried out again in other cases than the case where the gear is set to the neutral position again.

When in step S203 the throttle-completely-closed-state flag F_THIDLMG is "0", that is, when it is determined that the throttle is completely closed, the flow advances to step S204 to determine if the gear has previously been in the neutral position. When it is determined in step S204 that the previous gear position is the neutral one, it is then determined in step S205 if the transmission is currently in gear. When it is determined that the transmission is currently in gear, the flow advances to step S207 to restart the engine or return from the fuel supply cut state.

When it is determined in step S204 that the transmission has previously been in gear or it is determined in step S205 that the transmission is currently in neutral, the flow moves to step S214.

When in step S202 the clutch switch is "OFF", that is, it is determined that the clutch is engaged, it is then determined in step S211 if the transmission is currently in neutral. When it is determined in step S211 that the transmission is currently in gear, the flow returns after setting the restart-inhibiting delay timer tmFCMG in step S212. When it is determined in step S211 that the transmission is currently in neutral, it is determined in step S213 if the throttle-completely-closed-state flag F_THIDLMG is "1".

When it is determined in step S213 that the throttle-completely-closed-state flag F_THIDLMG is "1", the flow advances to step S206. If it is determined in step S211 that the transmission is in neutral and it is determined in step S213 that the throttle is thrust, restarting the engine or returning from the fuel supply cut state is carried out. When it is determined that the throttle-completely-closed-state flag F_THIDLMG is not "1"or the throttle is completely closed, the flow goes to step S214.

In step S214, the vehicle speed V is compared with the engine-stop-at-low-speed determining vehicle speed VIDLST. When it is determined that the vehicle speed V is lower than the engine-stop-at-low-speed determining vehicle speed VIDLST, the flow advances to step S216. When it is determined that the vehicle speed V is equal to or higher than the engine-stop-at-low-speed determining vehicle speed VIDLST, it is determined in step S215 if the brake switch is "ON" or "OFF". When in step S215 the brake switch is "OFF", the flow goes to step S208. When the brake is released during fuel supply cut while running, therefore, the engine returns from the fuel supply cut state. When the brake switch is "ON", on the other hand, the flow goes to step S216.

In step S216 is determined the flag F_FCMGBAT for determining whether or not to restart the engine based on the reduction in the remaining charge of the battery. When the restart flag F_FCMGBAT is "0", that is, when it is determined that the engine should be restarted because the battery's remaining charge has dropped, the flow advances to step S217.

When in step S216 the restart flag F_FCMGBAT is "1", that is, it is determined that restarting of the engine is unnecessary, the restart-inhibiting delay timer tmFCMG is set in step S218, and the flow then goes to step S219.

In step S217, the state of the restart-inhibiting delay timer tmFCMG is checked.

When in step s217 the restart-inhibiting delay timer tmFCMG is "0", the flow advances to step S207. When it is determined that the restart-inhibiting delay timer tmFCMG is not equal to "0", the flow advances to step S219.

In step S219, the absolute value of the brake-master-power negative pressure MPGA is compared with the absolute value of the brake-master-power negative pressure upper limit #MPFCMG (e.g., −430 mmHg). It is desirable that the brake-master-power negative pressure upper limit #MPFCMG be −465 mmHg, for example, when the vehicle is stopped, and be −540 mmHg when the vehicle is running in which state the negative pressure is easily secured.

When it is determined in this step that the brake-master-power negative pressure MPGA is equal to or lower than the brake-master-power negative pressure upper limit #MPFCMG ("YES"), a sufficient negative pressure is secured so that the flow returns without restarting the engine.

When it is determined that the brake-master-power negative pressure MPGA is closer to the atmospheric pressure than the brake-master-power negative pressure upper limit #MPFCMG ("NO"), the flow advances to step S208 to restart the engine.

In a case where the negative pressure of the brake-master-power negative pressure is likely to be gone due to pumping of the brake applied during stopping of idling or fuel cutting, the engine is restarted or the engine returns from the fuel cutting state in order to secure the brake force. As a result, the brake-master-power negative pressure MPGA is secured.

According to the present invention, as described above, when the engine speed with the clutch disengaged is equal to or less than a predetermined speed equal to or less than the idling speed, fuel cutoff is maintained considering that the driver intends to stop the vehicle even if the engine speed has reached the fuel-supply restart engine speed set in the fuel cutter. This can guarantee engine control that fulfills the driver intention to stop the vehicle by priority and reflects the driver intention.

This prevents the occurrence of shocks which would otherwise occur if the engine were restarted at an engine speed lower than the idling speed, so that the driver does not have an uncomfortable feeling. It is therefore possible to achieve engine control that reflects the driver's intention.

Further, this invention can ensure engine control that reflects the driver's intention more adequately, thereby permitting the driver to drive the vehicle without feeling uncomfortable.

Furthermore, this engine control system can allow the engine to be stopped according to the driver's intention to stop the vehicle.

What is claimed is:

1. An engine control system for a hybrid vehicle, having an internal combustion engine and an electric motor as driving force sources, comprising:

a clutch, operable by an operator of the vehicle, provided between said engine and a manually-operated transmission system, for disabling and enabling driving force transmission between said engine and said transmission system;

a clutch disengagement detector for detecting engagement or disengagement of said clutch;

an engine speed detector for detecting an engine speed; and a fuel cutter for permitting stopping and restarting of said engine in accordance with at least a result of detection by said clutch disengagement detector among predetermined drive conditions, and cutting fuel supply to said engine when said vehicle decelerates, a fuel-supply restart engine speed at which fuel supply is resumed being set in said fuel cutter, wherein said stopping engine is accomplished by cutting fuel supply by said fuel cutter, and wherein once the engine stop control is initiated, even when said engine speed reaches said fuel-supply restart engine speed, fuel supply cut by said fuel cutter is maintained, and when said engine speed detected by said engine speed detector at a time of disengagement of said clutch is detected by said clutch disengagement detector is equal to or less than a predetermined engine speed, fuel supply cut by said fuel cutter is maintained whereas when said detected engine speed is greater than said predetermined engine speed, fuel supply is restarted.

2. The engine control system according to claim 1, wherein fuel supply cut by said fuel cutter is maintained at least when a shift position of said vehicle running at a vehicle speed equal to or less than a predetermined value is other than a reverse position and low position.

3. The engine control system according to claim 1 or 2, wherein a condition for stopping said engine is that a brake pedal is actuated.

4. The engine control system according to claim 1, 2, or 3, wherein said predetermined engine speed is equal to or less than an idling speed.

* * * * *